J. CUNNINGHAM.
HAND BRAKE FOR RAILWAY VEHICLES.
APPLICATION FILED MAR. 15, 1920.

1,397,797.

Patented Nov. 22, 1921
4 SHEETS—SHEET 2.

J. CUNNINGHAM.
HAND BRAKE FOR RAILWAY VEHICLES.
APPLICATION FILED MAR. 15, 1920.

1,397,797.

Patented Nov. 22, 1921.
4 SHEETS—SHEET 3.

Inventor
James Cunningham
By Knight Bros
Attys

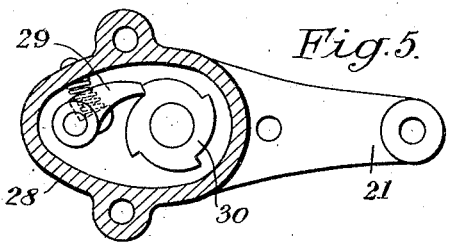
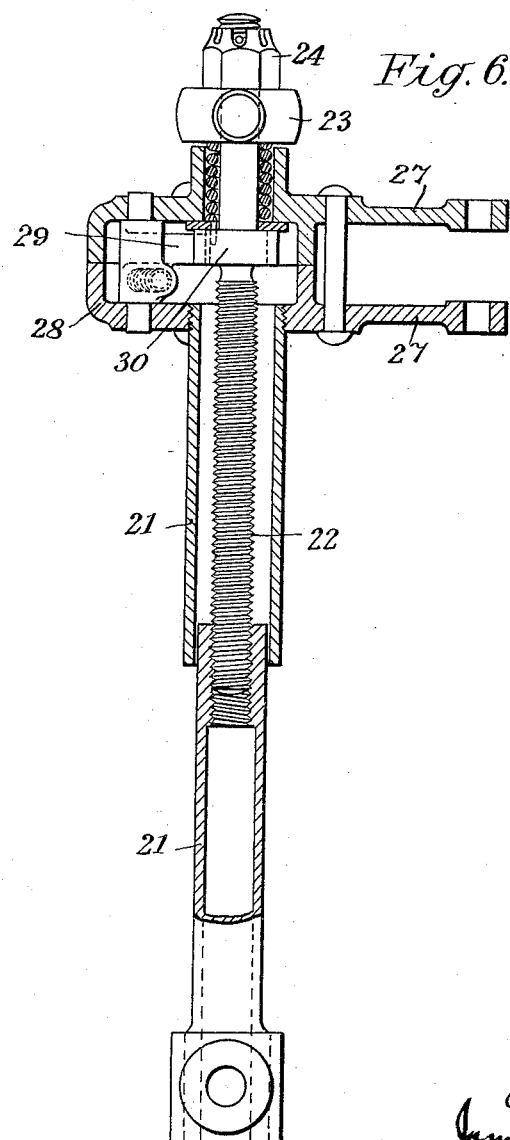

UNITED STATES PATENT OFFICE.

JAMES CUNNINGHAM, OF BATHGATE, SCOTLAND, ASSIGNOR OF ONE-HALF TO DICKSON AND MANN LIMITED, OF ARMADALE, LINLITHGOWSHIRE, SCOTLAND.

HAND-BRAKE FOR RAILWAY-VEHICLES.

1,397,797.  Specification of Letters Patent.  Patented Nov. 22, 1921.

Application filed March 15, 1920. Serial No. 365,915.

*To all whom it may concern:*

Be it known that I, JAMES CUNNINGHAM, a subject of the King of the United Kingdom of Great Britain and Ireland, and resident of Oaklea, Mill Road, Bathgate, Linlithgowshire, Scotland, engineer, have invented certain new and useful Improvements in and Relating to Hand-Brakes for Railway-Vehicles, of which the following is a specification.

This invention relates to hand brakes for railway vehicles of the type known as "either side" brakes and the invention has for its object to improve the construction of the operating mechanism for such brakes and the means whereby the brake operating mechanism is automatically adjusted so as to take up wear in the brake blocks and in the wheel treads.

In accordance with the present invention the vehicle is provided at each side with a short hand lever having connections to a rocking shaft carrying a crank or equivalent member adapted to operate—through the medium of toggle links and other connections—the usual brake cross shaft having means for operating the brake blocks. Between the said toggle links and the crank is an elastic connection, preferably comprising a member pivotally connected at one end to the crank and at the other end by a slotted pivotal connection to the toggle links, a compression spring being fitted upon said member between the crank and toggle links and a stop being provided for limiting the movement apart of said crank and toggle links under the action of said spring. The arrangement is such that the crank and toggle links are held in the braking position by the compression spring when the crank is moved just over its dead center to apply the brake.

The toggle links are adapted to automatically adjust the length of an adjusting member interposed between said toggle links and the brake shaft, for the purpose of taking up the wear in the brake blocks and wheel treads. Such adjusting members comprising ratchet driven screwed telescopic members are already known.

In order that the invention may be more clearly understood reference is hereinafter made to the accompanying drawings showing the preferred construction of the improved railway wagon brake by way of example.

Figure 4:
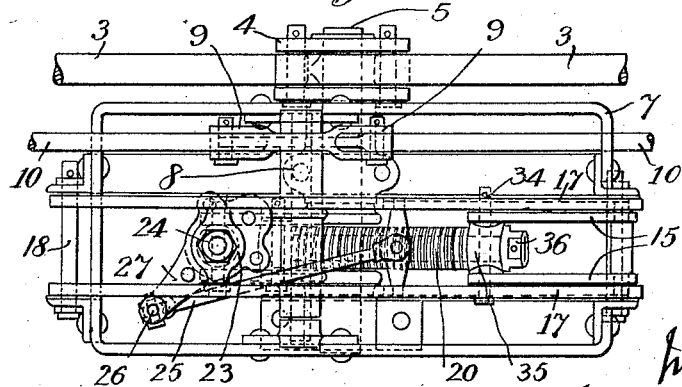

Fig. 4 a plan of the brake actuating and adjusting mechanism.

Fig. 5 is a detail cross section and Fig. 6 a vertical sectional view of the adjusting member hereinafter referred to.

Figure 1:
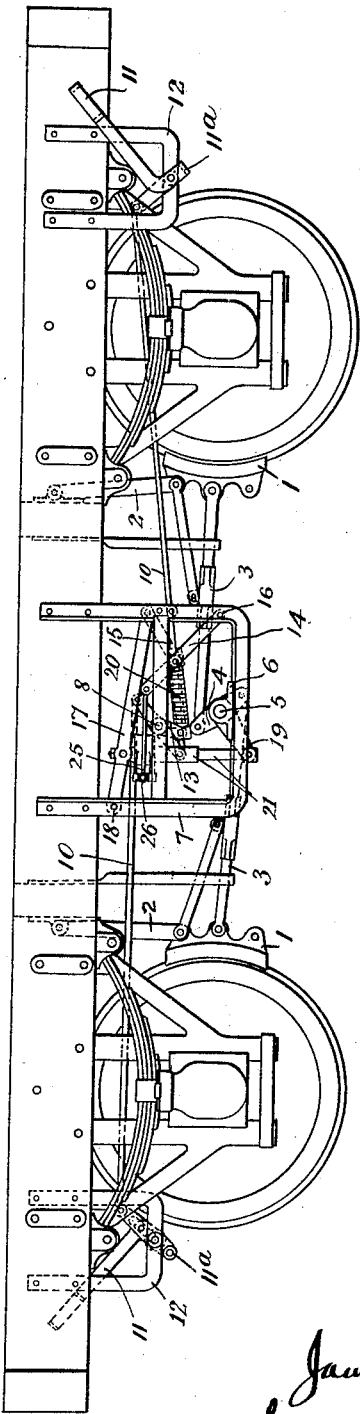
Figure 1 is a side view of the railway wagon frame having the improved brake.
Figure 2:
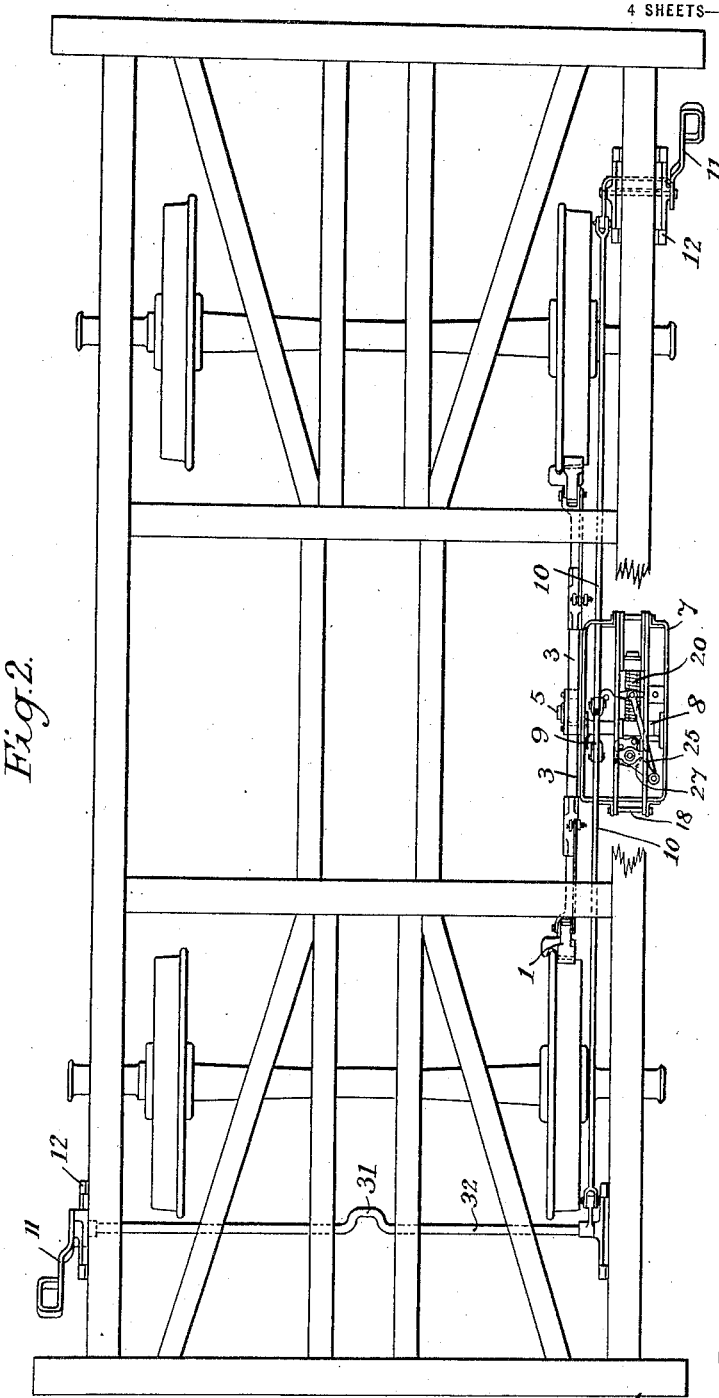
Fig. 2 is a plan of Fig. 1.
Figure 3:
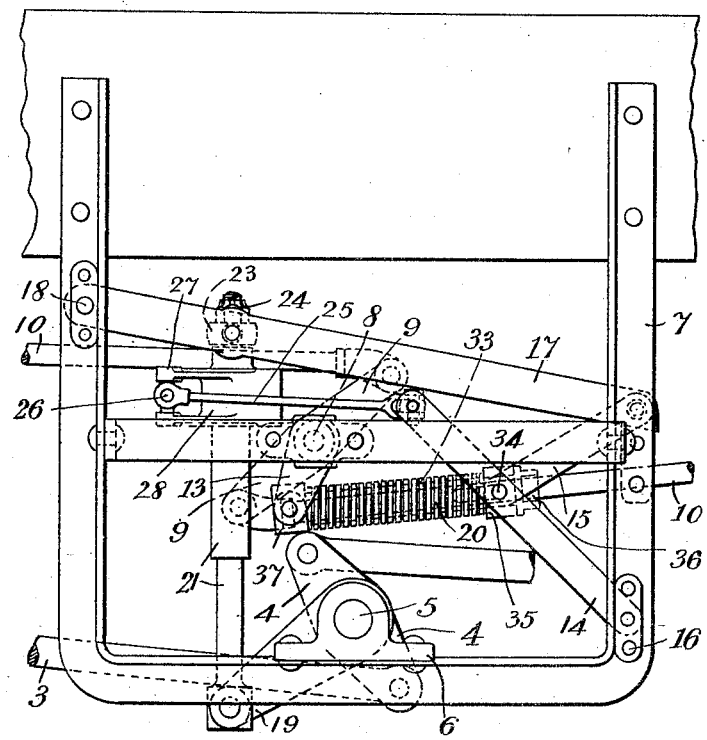
Fig. 3 is a detail side view.

As illustrated on the drawings the brake blocks 1 hung from the vehicle frame by the usual links 2, are connected by connecting rods 3, to crank arms 4 on a short transverse brake shaft 5 carried in suitable brackets beneath the frame of the vehicle and preferably supported as illustrated on bearings 6 carried by a stirrup or bracket 7 secured to the vehicle frame. Mounted above the brake shaft 5 is a rocking shaft 8 having a pair of crank arms 9 each connected by means of a pull rod 10 to a short hand lever 11 which is pivoted in depending brackets 12 on the sides of the vehicle frame, the tail pieces or extensions 11ª on the hand levers 11 serving as stops to limit the movement of the hand lever 11 by engagement with the depending bracket 12. The hand levers 11 are fitted at diagonally opposite corners of the vehicle as illustrated in Fig. 2 so that the brakes can be operated from either side of the vehicle.

The rocking shaft 8 is also provided with a crank 13 which is connected by means of an elastic connection, to a pair of toggle links 14 and 15, the link 14 being pivoted to the bracket 7 at 16 while the link 15 is pivotally connected to one end of a swinging lever 17 pivoted at its other end at 18 on the bracket 7. The swinging lever 17 operates the brakes by means of an automatically adjustable member which connects the swinging lever 17 to a crank or arm 19 on the brake shaft 5.

The elastic connection between the crank 13 and toggle links 14 and 15 comprises a spring 20 fitted upon a rod or like member 33 pivotally connected at one end to the crank 13 and having a slot at its other end for guiding the pivot pin 34 at the junction of the toggle links 14 and 15, said pin 34 passing through a block 35 which slides on the rod 33 and is limited in its outward movement by a stop 36 on the end of the rod 33.

The spring 20 is fitted between the sliding block 35 and the enlarged head 37 of the rod 33, so that it is capable of extension and compression between the crank 13 and the toggle links 14 and 15.

The adjustable member connecting the swinging lever 17 to the crank arm 19 comprises telescopically adjustable members 21, the adjustment of which is controlled by a screwed spindle 22 screwed into one end of the lower telescoping member and mounted to turn at its other end in a suitable bearing 23 carried by the swinging lever 17, the screwed spindle 22 having a securing nut 24 thereon. It will be understood that by rotation of the screwed spindle 22, the telescoping members 21 may be either extended or contracted in length. In order to effect this adjustment automatically the toggle link 14 has an extension connected by means of a link 25 and universal joint 26 to arms 27 projecting from a casing 28 carrying a pawl 29 adapted to swing around the axis of the said telescoping members 21 and adapted to coöperate with a ratchet wheel 30 fixed on the screwed spindle 22 in such manner that the movement of the ratchet wheel 30 contracts the telescoping members 21, thus adjusting the brake connecting and allowing for any wear in the brake blocks or wheels.

When the mechanism is operated from either side of the vehicle to apply the brakes, the actuation of the hand levers 11 cause the rotation of the rocking shaft 8 until the crank 13 therein is rotated past its dead center, in which position it is securely locked by the action of the spring 20 and the gravitation of the connected mechanism. The crank arm 13 in rotating, compresses the spring 20 and pushes forward the toggle links 14 and 15, thus raising the swinging lever 17 and thereby rotating the brake shaft 5 to apply the brakes. The toggle links 14 and 15 are held in the braking position by the said spring 20 locking the crank 13 in position over the dead center. The tail piece or extension 11ª on the hand levers 11, prevents the rocking shaft 8 from rotating farther than is necessary to securely lock the mechanism.

To release the brakes, either of the hand levers is actuated to return the crank 13 past its dead center, whereupon the action of the spring 20 and the gravitation of the connected mechanism will withdraw the brake blocks from the wheels and return the mechanism to its normal position, the tail piece or extension 11ª on the hand lever preventing undue travel of the mechanism in the reverse direction.

Until the brake blocks have worn down, the swinging movement of the pawl 29 is not sufficient to move the pawl beyond one of the teeth of the ratchet wheel 30, but as soon as the wear becomes so great as to cause the pawl 29 to engage the next tooth of the ratchet wheel 30 during the application of the brakes, the subsequent release of the brakes will automatically shorten the telescoping members 21, thus adjusting the connection so as to automatically take up the wear between the brake blocks and the wheels.

When it is desired to adapt the brake gear for operation by vacuum or Westinghouse mechanism, the piston of the latter mechanism may be connected to the improved brake gear at any convenient point, the stroke of the piston of the vacuum or Westinghouse cylinder being limited so that the crank arm 13 is not carried over the dead center, so that when the piston of the vacuum or Westinghouse cylinder is withdrawn the action of the spring 20 and the gravitation of the connected mechanism will release the brakes and return the mechanism to normal position. In the construction illustrated, the Westinghouse or vacuum brake is adapted to be connected to a crank or bend 31 in a cross shaft 32 interposed between one of the pull rods 10 and the hand lever 11 at the opposite side of the vehicle.

Claims:

1. In a railway vehicle brake, the combination of a member adapted to be rocked, toggle links pivoted together at their junction, and an elastic connection between said member and toggle links, one of said links having a fixed pivot and the other link having its end connected to mechanism for operating the brakes.

2. A railway vehicle brake according to claim 1 in which the parts are so disposed that the member and toggle links are held in the braking position by the elastic connection when the member is moved just over its dead center to apply the brake, substantially as described.

3. A railway vehicle brake according to claim 1 in which the elastic connection comprises a member pivotally connected at one end to said crank and having a slotted pivotal connection at the other end to said toggle links, a compression spring mounted upon said member between said crank and toggle links and a stop for limiting the movement apart of said crank and toggle links under the action of said spring, substantially as described.

4. A railway vehicle brake comprising a short hand lever at each side of the vehicle, a rocking shaft, connections to said shaft from said levers, a crank on said shaft, a pair of toggle links, a spring in compression between said crank and toggle links, and connections to the brakes from said toggle links, substantially as described.

5. A railway vehicle brake comprising a short hand lever at each side of the vehicle, a rocking shaft, connections to said shaft from said levers, a crank on said shaft, a pair of toggle links connected to the brakes, a member pivotally connected at one end to said crank and having a slotted pivotal connection at the other end to said toggle links, a compression spring mounted upon said member between said crank and links and a stop on said member for limiting the movement apart of said crank and toggle links under the action of said spring.

JAMES CUNNINGHAM.